(12) United States Patent
Beauchamp et al.

(10) Patent No.: US 7,079,638 B1
(45) Date of Patent: Jul. 18, 2006

(54) SYSTEM AND METHOD FOR PRIVACY SCREENING WITH SPECIAL INFORMATION TONES

(75) Inventors: William H. Beauchamp, Alabaster, AL (US); Erman Ronald Shea, Hoover, AL (US)

(73) Assignee: BellSouth Intellectual Property Corp., Wilmington, DE (US)

(*) Notice: Subject to any disclaimer, the term of this patent is extended or adjusted under 35 U.S.C. 154(b) by 676 days.

(21) Appl. No.: 10/251,135

(22) Filed: Sep. 20, 2002

(51) Int. Cl.
*H04M 1/663* (2006.01)
*H04M 3/42* (2006.01)
*H04M 7/00* (2006.01)

(52) U.S. Cl. ............ 379/196; 379/207.15; 379/210.03; 379/213.01; 379/221.08

(58) Field of Classification Search .............. 379/88.01, 379/188, 221.08, 142.01, 207.15, 210.02, 379/210.03, 213.01, 361
See application file for complete search history.

(56) References Cited

U.S. PATENT DOCUMENTS

| | | | |
|---|---|---|---|
| 5,533,106 A * | 7/1996 | Blumhardt | 379/142.02 |
| 5,701,301 A | 12/1997 | Weisser, Jr. | 370/428 |
| 5,838,774 A | 11/1998 | Weisser, Jr. | 379/92.02 |
| 5,920,623 A * | 7/1999 | Bensman et al. | 379/361 |
| 6,097,945 A * | 8/2000 | Evensen et al. | 455/422.1 |
| 6,775,364 B1 * | 8/2004 | Knox | 379/142.01 |
| 6,975,714 B1 * | 12/2005 | Zabel et al. | 379/199 |
| 2001/0033643 A1 * | 10/2001 | Mulvey et al. | 379/196 |

OTHER PUBLICATIONS

"Take Control of your Privacy and Put an End to those Annoying Telemarketing Calls", "Keep Your Private Life Private", www.telezapper.com, 8 pages, Sep. 12, 2002.

* cited by examiner

*Primary Examiner*—Harry S. Hong
(74) *Attorney, Agent, or Firm*—Withers & Keys, LLC

(57) ABSTRACT

A system and method delivers an audible tone to an unidentified caller who places a call to a subscriber to a privacy screening service with special information tones (SITs). The service is initiated when an unidentified caller places a telephone call to a subscriber. After the caller enters the telephone number of the subscriber, the service places a query to an SCP. The SCP determines the action to be taken for a call to a subscriber to privacy screening with SITs. If the called party is a subscriber to privacy screening with SITs, a SIT is generated, a privacy screening message is played and the call is handled as in known privacy screening services.

20 Claims, 2 Drawing Sheets

SYSTEM AND METHOD FOR PRIVACY SCREENING WITH SPECIAL INFORMATION TONES

FIELD OF THE INVENTION

This invention relates to the field of telecommunications. More particularly, the invention relates to generating Special Information Tones when an unidentified call is directed to a subscriber to a privacy screening service.

BACKGROUND

In recent years, a number of new telephone service features have been provided by an Advanced Intelligent Network (AIN). The AIN evolved out of a need to increase the capabilities of the telephone network architecture in order to meet the growing needs of telephone customers or users. The AIN architecture generally comprises two networks, a data messaging network and a circuit-switched, trunked communications network. The trunked communications network handles voice and data communications between dispersed network locations, while the data messaging network is provided for controlling operations of the trunked communications network.

A privacy screening service is a service that enables a subscriber to screen incoming calls. The privacy screening service provides information to the called party (in this case, the subscriber to the privacy screening service) that allows the subscriber to make an informed decision as to whether or not to answer a call. For example, a subscriber may (and typically does) use the privacy screening service to block all unidentified calls from being terminated (connected). Calls can be unidentified because the sending telecommunications carrier does not forward the calling telephone number to the receiving telecommunications carrier (because the sending carrier's equipment is incapable of sending the calling telephone number or because the call is coming from another area), or because the calling telephone number is marked "private".

Private telephone numbers are telephone numbers that block services such as "caller ID" that would otherwise identify the caller to the called party. A caller can request a private number so calls made from that line are always marked private or a caller can block the display of the telephone number for a particular telephone call by dialing a code such as *67.

In telephone systems that offer private numbers and a privacy screening service to its customers, an unidentified call to a subscriber with the privacy screening service cannot be completed automatically unless the subscriber authorizes the system to override the privacy screening service. In order for the subscriber to receive such a call, the privacy screening service forces the caller to make a selection that either allows the calling telephone number to be displayed or records a message from the caller. When the call is terminated, the privacy screening service subscriber will typically be notified that the privacy screening service has been invoked, and either the calling telephone number will be displayed or the recorded message will be played. The called party can then chose to respond to the call as he sees fit.

Typically, customers subscribe to a privacy screening system to avoid calls from unidentified callers such as telemarketers, who frequently employ private telephone numbers. Frequently, telemarketers canvass an area by using automatic dialers programmed to dial a list of telephone numbers. For example, an automatic dialer may be programmed to dial all the numbers between 0000 and 9999 in a targeted exchange. When the automatic dialer detects that a call has been answered by a person, the call is transferred to an available telemarketer.

Telecommunication systems typically indicate that a dialed number is disconnected or vacant (unassigned) by directing the call to an "intercept" routine. Typically, for example, when a call is made to a disconnected number, a standard information tone (SIT) is played, followed by a message such as: "I'm sorry. The number you have called has been disconnected. Calls are being taken by . . . " (or "No further information is available about . . . "). The tone that indicates that a number has been disconnected is a standardized series of three tones of a particular frequency and duration agreed upon by telecommunication companies. Similarly, the tone that indicates that a number is not in use is another series of three tones of particular frequency and duration. Automatic dialers frequently are programmed to detect and recognize these SITs and to put disconnected and vacant numbers identified by the SITs on a "Do Not Call" list.

As described above, although privacy screening helps to reduce the number of unwanted calls received by a subscriber, subscribers to a privacy screening service can receive unwanted calls. It would be helpful if there were a way to further reduce the number of unwanted calls terminated.

SUMMARY OF THE INVENTION

In the present invention, the aforementioned need is satisfied by a system and method that identifies as "disconnected" a telephone number belonging to a subscriber to a privacy screening service enhanced with special information tones (SITs). The system and method are employed in combination with an AIN-based telephone network having a service control point (SCP) and a database of information associated with the SCP. The present invention is initiated when a calling party dials the telephone number of a subscriber to the privacy screening service with SITs. After the calling party enters the telephone number of the subscriber, the service places a query to the SCP. The SCP determines the action(s) to be taken for a call to a subscriber to privacy screening with SIT. If the called party is a subscriber and the incoming call is marked "private" or does not include calling party telephone number, the SCP redirects the call to the services node (SN) servicing the subscriber's line. The SN then plays the "disconnected" special information tone before playing the privacy screening message. Because automatic dialers typically place disconnected telephone numbers on a "Do Not Call" list, the subscriber's number thus is likely to be placed on the "Do Not Call" list without the subscriber receiving the unwanted call.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

DETAILED DESCRIPTION OF PREFERRED EMBODIMENTS

Background Technology: Advanced Intelligent Network (AIN) System

Figure 1:
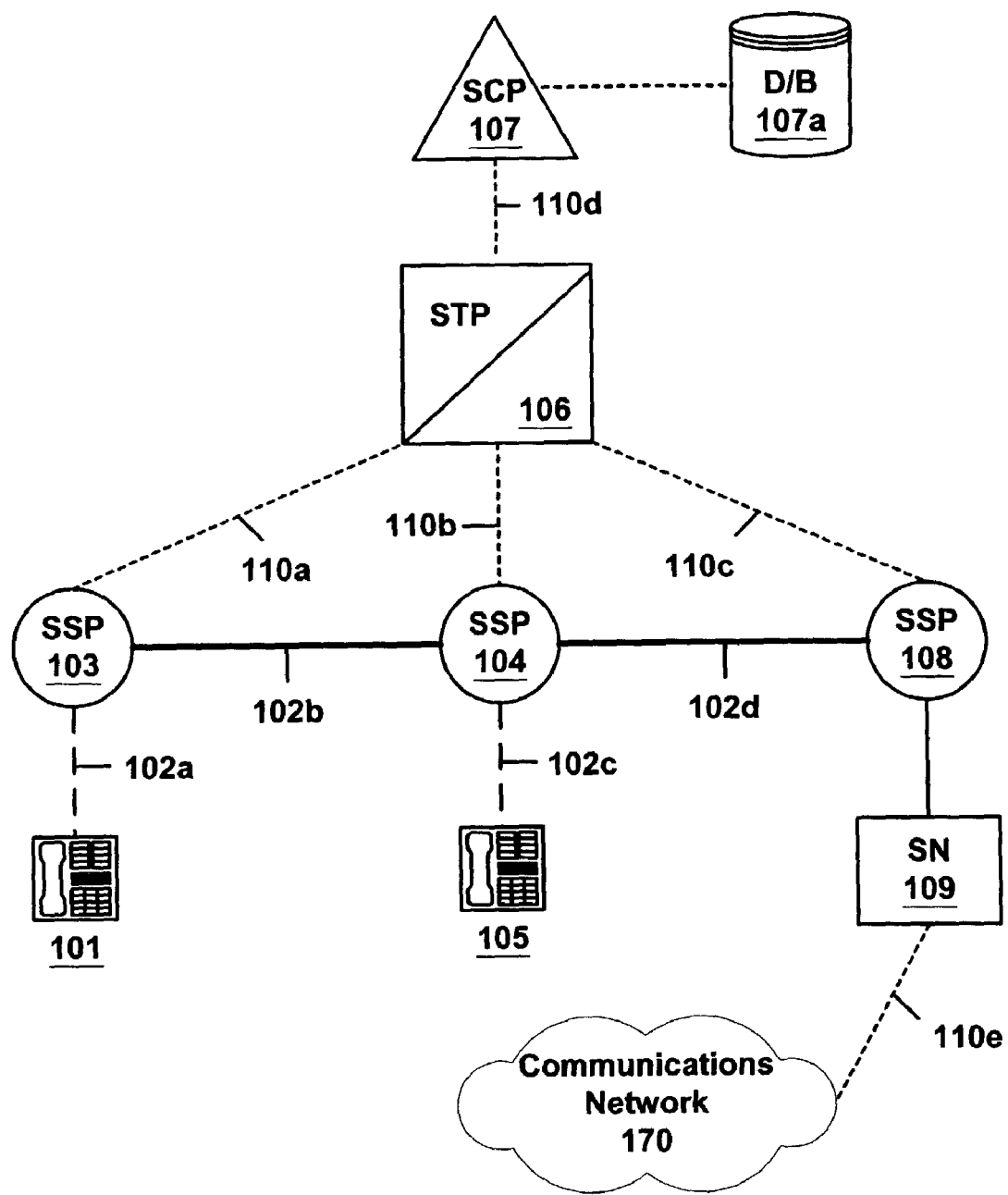
FIG. 1 illustrates, in a general block diagram form, an Advanced Intelligent Network (AIN) based system for implementing intelligent network management features, such as those which may be employed in connection with the present invention.

FIG. 1 is a block diagram of an exemplary telecommunication network, the public switched telecommunications network (PSTN). A portion of the PSTN is illustrated in FIG. 1 and is generally described below. Basic telephony concepts and terminology are used throughout the description as would be understood by one of skill in the art.

FIG. 1 illustrates a simplified AIN-based network arrangement. The AIN includes a variety of interconnected network elements. A group of such network elements includes a plurality of central offices (COs) 103, 104, 108 capable of generating AIN queries. Central Offices are also called service switching points (SSPs). A central office or SSP is a switch and the terms are used interchangeably herein. SSPs 103, 104 and 108 may comprise, for example, DMS100, 5ESS or EWSD switch types. These switches may be manufactured by, for example, Lucent Technologies, Inc., Murray Hill, N.J.; Nortel Networks, Brampton, Ontario, Canada; or Siemens AG, Munich, Federal Republic of Germany, respectively.

As further illustrated in FIG. 1, SSPs 103, 104 and 108 have a plurality of subscriber lines 102a and 102c connected thereto. Each SSP serves a designated group of subscriber lines, and thus, the SSP 103, 104 or 108 that serves a particular line may be referred to as its serving switch. Each line is connected typically to a piece of terminating equipment including a plurality of telephones designated, e.g., as 101 and 105. Although telephones are illustrated as the pieces of terminating equipment in FIG. 1, those skilled in the art will understand that such pieces include other telecommunications devices such as facsimile machines, computers, modems, etc.

The system includes a first telephone station referred to herein as telephone station 101 and a second telephone station 105. SSPs 103, 104 and 108 are interconnected by a plurality of trunk circuits 102b and 102d. These are the voice path trunks that interconnect the SSPs to connect communications. The term "communication" or "call" is used herein to include all messages that may be exchanged between caller and called party in the network illustrated in FIG. 1. Trunks 102b and 102d may be either Signaling System 7 (SS7) controlled or multi-frequency trunk (MF) and the type of trunk will be in accordance with both the sending and receiving SSP to which it is connected.

Each switch may include different types of facilities and/or triggers. SSPs 103, 104 and 108 are each programmable switches which may perform the following functions: recognize AIN-type calls, launch queries to service control point (SCP) 107, and receive commands and data from, for example, SCP 107 to further process and route AIN-type calls. When one of SSPs 103, 104 and 108 is triggered by an AIN-type call, the triggered SSP 103, 104 and 108 formulates and sends an AIN query. Based on the reply from the AIN type call, SSP 103, 104, and 108 responds to call processing instructions from the network element in which the AIN service logic resides. AIN service logic may reside at SCP 107.

Each of SSPs 103, 104 and 108 is connected to a signal transfer point (STP) 106 via respective data links 110a, 110b and 110c. In order to facilitate signaling and data messaging, each SSP 103, 104, and 108 may be equipped with Common Channel Signaling (CCS) capabilities, e.g., SS7, which provides two-way communications of data messages over CCS links 110a, 110b and 110c between components of the AIN network. These data links employ the SS7 signaling protocol, which is well-known to those skilled in the art, although it will be understood that any other suitable protocol could be employed.

The data messages may be formatted in accordance with the Transaction Capabilities Applications Part (TCAP). Alternatively, Integrated Service Digital Network (ISDN), Users Part (ISUP) may be used for signaling purposes between, for example, SSPs 103, 104 and 108. In such a case, SSPs 103, 104 and 108 may be equipped with the capability to map appropriate data between TCAP and ISUP protocols, and vice versa. The telephone network essentially employs an upper-level software controlled network through the STP 106 and SCPs 103, 104 and 108.

AIN SSPs 103, 104 and 108 may allow normal switch processing to be suspended at specific points in a call so that the switch may send an AIN message query via STP 106 to SCP 107. STP 106 is a signaling hub that routes packets of data over the common channel signaling network. Common channeling signaling are data communications networks laid over the system's switching network that carry data and control messages to and from and among the SSPs, STPs, and SCPs in the network. SS7 is the protocol that typically runs over common channel signaling networks. A common channel signaling network using the SS7 protocol is often referred to as an SS7 network. The SS7 network carries data and control messages to the SSPs in the telephone network.

A set of triggers may be defined at SSPs 103, 104 and 108. A trigger in the AIN is an event associated with a particular call that initiates a query to be sent to SCP 107. The trigger may cause SCP 107 to access processing instructions with respect to the particular call. The results of processing at SCP 107, which may include database inquiries, are sent back to SSP 103, 104 or 108 through STP 106. The return packet may include instructions to SSP 103, 104 or 108 as to how to process the call. The instructions may be to take some special action as a result of a customized calling service, enhanced feature, or subscriber service. In response, SSP 103, 104 and 108 may move through its call states, and generate further packets that are used to set up and route calls. Similar devices for routing calls among various local exchange carriers are provided by regional STPs and regional SCPs.

An example of such a trigger is an off-hook delay trigger (OHDT), which causes a query to be sent to SCP 107 when a call is made from a particular calling line. Other triggers include a termination attempt trigger (TAT), which causes a query to be sent to SCP 107 whenever an attempt is made to complete a call and a Public Office Dialing Plan (PODP) trigger, although other suitable triggers may be used.

SCP 107 may execute software based service logic and return call-processing instructions to the triggering AIN SSP. New services may be provisioned by assigning AIN SSP triggers to customer lines, trunks, and/or North American Numbering Plan (NANP) telephone numbers.

Much of the intelligence of the AIN resides in SCPs such as SCP 107 of FIG. 1. SCP 107 is connected to STP 106 over an SS7 or other suitable data link 110d. SCPs are fault-tolerant computers, e.g., AT&T Star Server FT Model 3200 or AT&T Star Server FT Model 3300 computers (these and more current computers such as the Advantage P200 and Advantage 4P200 models are presently available from Lucent Technologies). SCPs are "intelligence centers" with access to applications databases that enable the network to deliver advanced services such as caller ID, privacy screening, and call forwarding.

Among the functions performed by SCPs such as SCP 107 is the hosting of network databases that may be stored in database objects such as database object 107a. Database object 107a is shown as a database communicatively coupled to SCP 107, although data storage object 107a may be embodied as a component within SCP 107, such as an internally-mounted hard disk device. The databases stored in data storage objects such as data storage object 107a may be used in providing telecommunications services to a customer.

The SCPs also execute service package applications (SPAs) that deliver the advanced services. Typically, for example, SCP 107 is also the repository of SPAs that are used in the application of telecommunications services, enhanced features, or subscriber services to calling lines. Additionally, SPAs may use databases for providing telecommunication services.

The system of FIG. 1 may also include services circuit nodes (SCNs) also referred to herein as services nodes (SNs). SNs such as SN 109 are also referred to as Intelligent Peripherals (IPs) and are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network and to collect digits from a caller or subscriber. The SN's voice circuits can also be programmed to provide a voice response (e.g., to play pre-selected announcements) to callers and to perform voice recognition. SNs can also be programmed to respond to input from the callers by, for example, further routing the call.

Thus SN 109 is a programmable interactive data system that can act as a switch to transfer calls. SN 109 may provide interactive help, collect voice information from participants in a call, provide notification functions and/or store subscriber data. SN 109 may be a Lucent Technologies Star Server FT Model 3200 or Model 3300 although other units may be employed. SN 109 may include a data assembly interface. In addition, SN 109 may request SCP 107 to retrieve information from database 107a containing information concerning calling party 101 or called party 105, may receive information from SCP 107, may make outgoing calls to called party telephone station 105, may convert alphanumerical textual data to speech, may announce converted information retrieved from SCP 107 to called party telephone station 105 and/or may connect telephone station 101 to called party telephone station 105.

Communications link 111 between SSP 108 and SN 109 may be a primary rate interface (PRI) or basic rate interface (BRI) line or any other suitable telephone line. PRI and BRI lines are circuit-switched ISDN lines. SN 109 may be communicatively coupled to a network 170 via a data link 110e using an X25, TCP/IP or SS7 protocol or any other suitable protocol.

Accordingly, connections by links 110a, 110b, 110c, 110d and 110e are for signaling purposes and allow SSPs 103, 104 and 108 to send and receive messages to and from SCP 107 and SN 109. For purposes of illustration, various features will now be described from the standpoint of a switch implementing AIN protocols, provisioned with OHDT (off-hook delay trigger), TAT (termination attempt trigger), or PODP (public office dialing plan) triggers.

At telephone station 101, a calling party (caller) may place a call to telephone station 105 (the called party). Assume that telephone station 105 serves a subscriber to a privacy screening service. When the caller places a call to the subscriber of telephone station 105, the call is routed by SSP 103 to SSP 104. Because the called party of telephone station 105 subscribes to a privacy screening service, telephone station 105 is typically associated with a termination attempt trigger (TAT) at SSP 104. Hence when the call is made from the caller at telephone station 101 to the subscriber of telephone station 105, a TAT is triggered at SSP 104. In response to the TAT, SSP 104 sends a message to SCP 107 via STP 106, asking for directions as to how the call should be completed. The query sent to SCP 107 includes the following information: the subscriber's telephone number (in the called party field), the caller's telephone number, if available, (in the calling party field), the calling party's presentation restriction indicator (also in the calling party field) and optionally, the trigger criteria type (indicating the service for which the query is intended).

SCP 107 checks the presentation indicator in the calling party field of the query received as a result of TAT trigger. If presentation of the caller's number is not restricted, i.e., if the caller's number is public, and the caller's number is known, SCP 107 sends back a response, instructing SSP 104 to complete the call, and, typically, to supply the caller's telephone number and possibly the caller's name to the called party. SSP 104 completes the call, i.e., terminates the call, supplying the privacy screening subscriber with the caller's number (and possibly also with the caller's name). If the caller's name is to be supplied to the customer, SSP 104 may launch another query to the SCP 107 to obtain the caller's name from either database 107a or another database on the system that contains the names corresponding to the telephone number of the caller.

If presentation of the caller's number is restricted (i.e., the caller's telephone number is marked "private") or there is no calling number information, the caller may be asked to permit the display of the caller's telephone number, or record his or her name and reason for calling, as follows: if the caller's number is private or unknown, SCP 107 enters the privacy screening subscriber's telephone number in the calling party field, determines which SN handles calls to telephone station 105, and directs SSP 104 to forward the call to that SN (e.g., SN 109). When SN 109 answers the call, it typically asks the caller to either allow the display of his telephone number or record his or her name and reason for calling. If the caller party responds by recording a message, SN 109 then completes the call, using the subscriber's telephone number that had been stored in the calling party field.

The TAT provisioned on the subscriber's line at SSP 104 triggers a second time, sending a query to SCP 107 through STP 106. SCP 107 recognizes that this call originated with a services node, SN 109, and sends a response authorizing completion of the call to the subscriber. If the subscriber chooses to accept the call, the call is put through. If the subscriber refuses to accept the call, the calling party is informed that his or her call was not accepted, and the call is disconnected.

The system may alternately operate as follows when the caller number is known (whether the calling party number is public or private). In this case, when the caller dials the subscriber's number, the call is routed through the caller's SSP (SSP 103) to the privacy screening subscriber's SSP 104. The call triggers the subscriber's TAT at SSP 104, triggering a query that is sent up to SCP 107 via STP 106. SCP 107 checks the caller ID and presentation indicator for the telephone number in the query, determines whether the caller is known and public, known and private or unknown. If the calling party is known and public, SCP 107 sends back a response authorizing completion to the subscriber. SSP 104 then completes the call to the subscriber presenting the privacy screening subscriber the caller's number and possibly name.

If the calling party number is known and private, SCP 107 re-writes the presentation indicator as "public" i.e., redefining the presentation indicator in the presentation indicator field as public. SCP 107 responds to the TAT query from SSP 104 by directing SSP 104 to forward the call to SN 109, with the presentation indicator re-written as public. SCP 107 responds to the TAT query from SSP 104 by directing SSP 104 to forward the call to SN 109, with the presentation indicator re-written as public. SSP 104 writes the subscriber's number in the "re-directing party" field, and forwards the call to SN 109 at SN 109's number via SSP 108. Thus, when the call is presented to SN 109, the call has the subscriber's number in the "re-directing party" field, and the original calling party's number in the "calling party" field. Because SCP 107 has toggled the presentation indicator from "private" to "public", SN 109 has access to the calling party number. SN 109 answers the call, and plays an announcement to the calling party, asking for his/her permission to present his/her number (and name) to the privacy screening subscriber. If the calling party refuses to grant permission to present his/her number (and name) to the subscriber, the call is disconnected. If the calling party agrees to have his/her number (and name) presented, further processing is performed and the call is completed.

Thus it can be seen that in either of the systems described above, if the caller party does not agree to have his/her number and name presented to a called party who subscribes to a privacy screening service and refuses to record a message, the call is disconnected. However, by recording a message, privacy screening can be circumvented.

The system described can be implemented for an AIN or AIN-type network using a computer telephony system. The Advanced Intelligent Network system is described in U.S. Pat. No. 5,701,301 and U.S. Pat. No. 5,838,774, which are hereby incorporated by reference.

System and Method for Privacy Screening with Standard Information Tones According to the Present Invention Referring now to the figures, a preferred embodiment of the system and method of the present invention will be described.

The system and method described for caller detection of privacy screening with Standard Information Tones (SITs) may be implemented for an AIN or AIN-type network using the basic computer telephony system described above. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

FIG. 1 shows a caller's telephone 101 connected via the calling party's voice line 102*a* to its SSP 103. SSP 103 is connected via voice trunk 102*b* to a second SSP (SSP 104). SSP 104 is the SSP that services the called party's telephone 105. For example, the called party may be a subscriber to the privacy screening service with SITs.

When a caller at telephone station 101 places a call to a subscriber to privacy screening with SITs, the called party at telephone station 105, the call is routed to SSP 103. SSP transfers the call to SSP 104. At SSP 104 a termination attempt trigger (TAT) is encountered for the subscriber.

At this point, the call is suspended. In response to the TAT, SSP 104 sends a query to SCP 107 via STP 106 asking for directions as to how the call should be completed. For example, the query typically includes the following information: the caller's telephone number, if available, (in the calling party field), the subscriber's telephone number (in the called party field), the calling party's presentation restriction indicator (also in the calling party field), and, optionally, the trigger criteria type (indicating the service for which the query is intended).

If the caller's telephone number is known and the caller's presentation restriction indicator is "public", SCP 107 authorizes the termination (i.e., connection) of the call. If the caller's presentation indicator is "private" or the caller's number is unknown, in one embodiment SCP 107 looks up the subscriber's telephone directory number in its database 107*a* to see what SN, (e.g., SN 109), handles the subscriber's line, the call is redirected to that SN, the SN plays the "disconnected" SIT and the normal privacy screening message as described above. If the caller allows his telephone directory number to be displayed or records a message, the call is terminated (i.e., the caller's call is connected to telephone station 105).

If the caller's presentation indicator is "private", but the caller's telephone number is known, SCP 107 may compare the caller's telephone number with a list of telephone numbers associated with the subscriber. Callers from these telephone numbers may be terminated even though the caller has a "private" number. This feature is meant to enable the subscriber to receive calls from parties known to the subscriber that have private numbers. Preferably the subscriber is prompted for these telephone numbers when the privacy screening with SIT service is initiated. Preferably the subscriber can modify this list as desired.

Alternatively, a personal identification number (PIN), provided by the subscriber to the caller, may be entered by the caller when the normal privacy screening message is played. Entering the PIN number enables the privacy screening call processing to be bypassed so that the call is connected. This feature is meant to enable the subscriber to receive calls from a party known to the subscriber, the party having a private number.

Instead of redirecting the call to an SN, SCP 107 may route a message to SSP 104 to play the "disconnected" SIT and normal privacy screening message. Alternatively, instead of playing a "disconnected" SIT, another type of information tone, such as but not restricted to a "vacant" SIT may be played.

However, as will be apparent to those of ordinary skill in the art based on the disclosure provided herein, the present invention is not limited to implementation through these particular triggers and protocols and may be designed and provisioned with a network utilizing other triggers and protocols. For example, SSP 103, 104 and 108 may represent a TCP/IP telecommunications switching network gateway. One skilled in the art will further recognize that the above-described network is a simplified network meant for explanatory purposes. It is likely that a telephone network will comprise numerous user stations, SSPs, STPs, SCPs, and SNs along with other telephone network elements.

Figure 2:
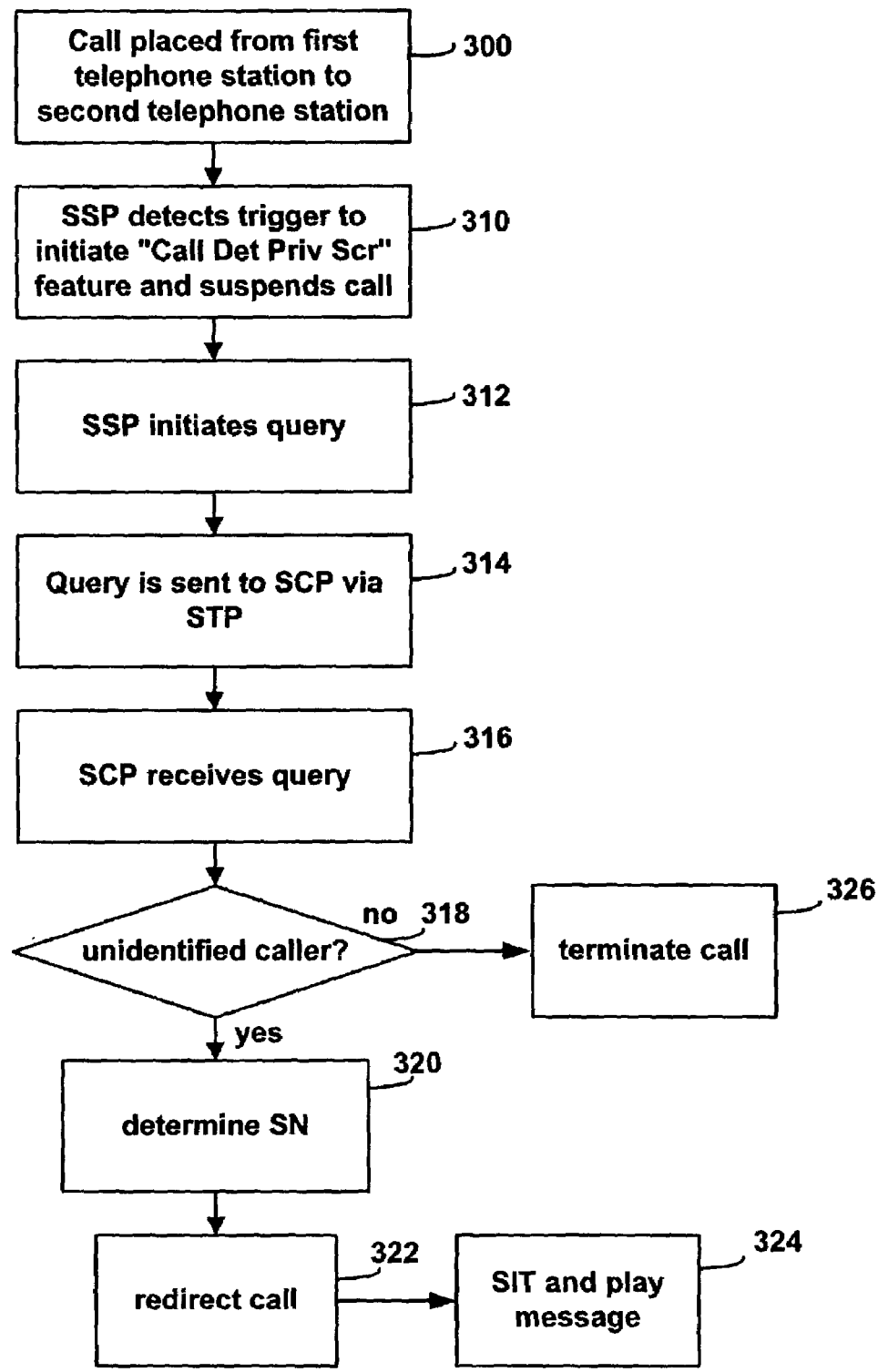
FIG. 2 is a flowchart of an exemplary process for providing a service for caller detection of a privacy screening service in accordance with the present invention.

Referring now to FIG. 2, there is illustrated an overview of the call flow logic according to one embodiment of the present invention.

Not shown in FIG. 2, but present in one embodiment of the present invention, is the entering of telephone numbers to a list (preferably initially taking place at service set-up time). Calls from numbers on the list will not invoke the privacy screening with SIT service. Alternatively, a PIN may be established for the subscriber such that entering the PIN after the normal privacy screening message plays at step 324 bypasses further privacy screening processing.

The call flow for the privacy screening with SITs as illustrated in FIG. 2 begins when, at step 300, a caller at a first telephone station (e.g., the calling party 101) places a call to a second telephone station (e.g., the called party 105).

If a list of numbers for which privacy screening with SITs is not invoked has been entered, the telephone number of the caller may be compared to the list of numbers. If the caller number is found on the list, the call may be routed over the telephone network via normal procedures, as if the called party was not a subscriber to a privacy screening service. If the caller number is not found on the list, processing continues as described below.

The SSP to which the first telephone station is attached (e.g., SSP 103) sends the call to the SSP to which the second telephone station is attached (e.g., SSP 104). Subscribers to privacy screening with SITs are provisioned with a termination attempt trigger (TAT) at their SSP (e.g., SSP 104). At step 310, that SSP (e.g., SSP 104) detects the TAT associated with the subscriber's number and suspends the call.

At step 312, the SSP (e.g., SSP 104) initiates a query associated with the call to privacy screening with SIT subscriber of the second telephone station (e.g., telephone station 105). At step 314, the query is routed to an SCP (e.g., SCP 107) via an STP (e.g., STP 106). Accordingly, the query may contain information identifying the first telephone station (the caller) and subscriber of the second telephone station.

At step 316, the SCP receives the query and responds to the query by launching an instance of a logic program that is referred to herein as a service package application (SPA). Specifically, at step 318 the application determines if the presentation restriction indicator is marked "private" or if the caller's telephone number is unknown. If so, the SN (e.g., SN 109) associated with the second telephone station may be determined from the database associated with the SCP (e.g., database 107a) at step 320 and the call may be redirected to that SN at step 322.

At step 324 the SN may play the SIT that indicates that the telephone number is disconnected and the normal privacy screening message. Following step 324 (not shown) processing continues as described above with respect to known privacy screening services.

If at step 318 the SPA determines that the caller is identified (the presentation restriction indicator is not marked "private" and the caller's telephone number is known), the call is terminated at step 326.

Alternatively, if at step 318, the SPA determines that the presentation restriction indicator is marked "private" or the caller's telephone number is unknown, the SCP may send a message to the appropriate SSP (e.g., SSP 104) instructing the SSP 104 to play the "disconnected" SIT tone and normal privacy screening message.

The SIT that is played may be a tone that indicates that the line is vacant (not assigned to anyone) rather than "disconnected". Alternatively, any suitable tonal message may be played.

The playing of the SIT may be determined by a subscriber option, so that the subscriber can specify whether the SIT will be played when an unidentified call is received.

The appropriate SN or SSP may be employed to generate an announcement to the caller to a subscriber, using computer-generated text-to-speech conversion routines or in an alternate embodiment, using pre-recorded sound files or other suitable files. The announcement further preferably provides notice that the called line has been disconnected or may play any other suitable message.

It is noted that the foregoing examples have been provided merely for the purpose of explanation and are in no way to be construed as limiting of the present invention. As an example, if a function such as a database query is attributed to a network element such as an SSP, such query may be performed alternatively or additionally by an SCP or by any other suitable network element without departing from the spirit and scope of the invention.

What is claimed is:

1. A system comprising:
   a computing device providing privacy screening of incoming calls;
   at least one network interface which communicatively connects the computing device to a first switching means associated with a first telecommunications device and a second switching means associated with a second telecommunications device, wherein the first telecommunications device attempts connection of a call to the second telecommunications device;
   software operating in the computing device which detects a connection attempt to the second telecommunications device and directs one of the second switching means and an intelligent peripheral means to perform one of completion of the call and the generation of a tone that is indicative to the incoming call that a directory number for the connection of the call has no called party assigned to it;
   wherein the software directs completion of the call if a telephone number of the first telecommunications device is one of known and determinable by the computing device and wherein the software directs generation of a tone only if a telephone number of the first telecommunications device is one of unknown and undeterminable by the computing device.

2. The system of claim 1, wherein the first switching means and the second switching means are part of the same equipment.

3. The system of claim 1, wherein the intelligent peripheral means generates at least one of the tone and an audible message to the first telecommunications device and wherein the tone comprises one of a disconnected tone and a vacant tone to indicate that the directory number for the connection of the call has no called party assigned to it.

4. The system of claim 1, wherein the system comprises advanced intelligent network components and the first switching means, the second switching means, the computing device and the intelligent peripheral means comprise a first service switching means point, a second service switching point, a service control point and a service node respectively.

5. The system of claim 1, wherein one or more of the first switching means and the second switching means comprise a TCP/IP gateway.

6. The system of claim 1, wherein the intelligent peripheral means is further communicatively coupled to a communications network using one of an X25, TCP/IP and SS7 protocol.

7. A computer-readable medium having computer-executable instructions for identifying a telephone directory number associated with a privacy screening service as unused when an unidentified caller makes a call from a first telephone station via a first switch to a second telephone station via a second switch, the method comprising:
 receiving a query from the second switch, the query being initiated by a connection attempt to the second switch: and
 generating a tone in response to determining that identification of the first telephone station is required for completion of the call and further in response to determining that the first telephone station is unidentified.

8. The computer-readable medium of claim 7, wherein the method further comprises:
 connecting the call if the directory number is included in a list associated with the second telephone station.

9. The computer-readable medium of claim 7, wherein the method step of generating a tone further comprises:
 determining an intelligent peripheral associated with the second telephone station and
 sending a message to the intelligent peripheral for generating the tone to the first telephone station.

10. The computer-readable medium of claim 7, wherein the method step of generating a tone that indicates that no called party is assigned to the call indicates that the telephone directory number associated with the second telephone station is one of vacant and disconnected.

11. The computer readable medium of claim 7, wherein the method is performed in an Advanced Intelligent Network (AIN) having a service switching point and a service control point, wherein said service switching point hosts a termination attempt trigger associated with the second telephone station, and wherein the receiving step comprises:
 actuating the termination attempt trigger: and
 querying the service control point to obtain information associated with the second telephone station from a database.

12. The computer-readable medium of claim 7, wherein the method also functions if the first switch and the second switch are part of the same telecommunications equipment.

13. A method for identifying a telephone directory number associated with a private screening service as unused when a caller makes a call from a fist telephone station via a first switch to a second telephone station via a second switch, the method comprising:
 receiving a query from the second switch, the query being initiated by a connection attempt: and
 generating a tone in response to determining that identification of the first telephone station is required for completion of the call and further in response to determining that the first telephone station is unidentified.

14. The method of claim 13, wherein the method also functions if the first switch and the second switch are part of the same telecommunications equipment.

15. The method of claim 13, wherein generating a tone that indicates that there is no called party assigned to the directory number of the call comprises generating one of a disconnected tone and a vacant tone and transmitting the tone to the first telephone station.

16. The method of claim 13, generating a tone further comprises playing a privacy screening message to the first telephone station.

17. The method of claim 13, further comprising:
 allowing the call to be connected if the directory number is included in a list associated with the second telephone station.

18. The method of claim 13, wherein generating a tone further comprises:
 determining an intelligent peripheral associated with the second telephone station; and
 sending a message to the intelligent peripheral for generating the tone to the first telephone station.

19. The method of claim 13, wherein generating a tone indicates that the telephone directory number associated with the second telephone station is one of vacant and disconnected.

20. The method of claim 13, wherein the method is performed in an Advanced Intelligent Network (AIN) having a service switching point and a service control point, wherein said service switching point hosts a termination attempt trigger associated with the second telephone station, and wherein the receiving step comprises:
 actuating the termination attempt trigger; and
 querying the service control point to obtain information associated with the second telephone station from a database stored at the service control point.

* * * * *